United States Patent [19]

Katagiri

[11] Patent Number: 5,055,020

[45] Date of Patent: Oct. 8, 1991

[54] MOLD FOR MANUFACTURING A SKIN COVERED FOAMED PLASTIC ARTICLE

[75] Inventor: Hiroyuki Katagiri, Ayase, Japan

[73] Assignee: Ikeda Bussan Co., Ltd., Kanagawa, Japan

[21] Appl. No.: 619,652

[22] Filed: Nov. 27, 1990

Related U.S. Application Data

[63] Continuation of Ser. No. 412,943, Sep. 26, 1989, abandoned.

[30] Foreign Application Priority Data

Oct. 31, 1988 [JP] Japan ............................ 63-142208[U]

[51] Int. Cl.$^5$ ........................ B29C 39/10; B29C 39/40
[52] U.S. Cl. ..................................... 425/111; 249/82; 249/83; 249/91; 249/172; 264/45.2; 264/46.4; 264/266; 425/125; 425/817 R
[58] Field of Search .................... 264/46.4, 46.6, 46.8, 264/45.2, 45.4, 313, 266; 249/82, 83, 87, 91, 92, 93, 94, 96, 97, 170–172; 425/110, 111, 117, 125, 388, 4 R, 817 R, 112

[56] References Cited

U.S. PATENT DOCUMENTS

| 3,380,703 | 4/1968 | Zastrow | 249/172 |
| 3,478,135 | 11/1969 | Randall | 264/45.2 |
| 4,026,979 | 5/1977 | Palomares | 264/45.5 |
| 4,579,700 | 4/1986 | Cavender | 425/812 R |
| 4,828,325 | 5/1989 | Brooks | 284/45.2 |

FOREIGN PATENT DOCUMENTS

| 161277 | 10/1952 | Australia | 264/46.6 |
| 1901828 | 8/1970 | Fed. Rep. of Germany | 264/46.8 |
| 54-3189 | 2/1979 | Japan | 264/46.6 |
| 1032766 | 6/1966 | United Kingdom . | |
| 1124356 | 8/1968 | United Kingdom . | |
| 1143199 | 2/1969 | United Kingdom . | |
| 1178886 | 1/1970 | United Kingdom . | |
| 1208466 | 10/1970 | United Kingdom . | |
| 1514574 | 6/1978 | United Kingdom . | |

Primary Examiner—Jay H. Woo
Assistant Examiner—Khanh P. Nguyen
Attorney, Agent, or Firm—Weiser & Stapler

[57] ABSTRACT

A mold for manufacturing a skin covered foamed plastic article, with which it is possible to place the skin cover at a desired position, without spoiling or damaging the skin cover, such that the skin covered foamed plastic article of a desired shape without any deficiencies such as wrinkles and dents can easily be manufactured. The mold includes an upper mold; and a lower mold, to be assembled with the upper mold in order to form a cavity in which a liquid foam resin undergoes foaming process to become the pad member, over which a skin cover is to be placed, the lower mold including at least one windows at which the skin cover can be pushed outward by pressure of the liquid foam resin.

2 Claims, 2 Drawing Sheets

MOLD FOR MANUFACTURING A SKIN COVERED FOAMED PLASTIC ARTICLE

This application is a continuation of application Ser. No. 07/412,943 filed Sept. 26, 1989 now abandoned.

BACKGROUND OF THE INVENTION

1. Field of the Invention

The present invention relates to a mold for manufacturing a foamed plastic article such as that to be used for a car seat cushion or a seat back.

2. Description of the Background Art

Car seat cushions and seat backs have been made of skin covered foamed plastic articles comprising a pad member covered by a skin cover. The pad member and the skin cover used to be manufactured separately and combined together later, but it has become fashionable to manufacture a skin covered pad member altogether by forming foamed plastic in a skin cover laid over a mold, so that the process of combining at a later time may be omitted.

In the manufacturing process for such a skin covered foamed plastic seat, it has conventionally been necessary to use adhering means such as double sided adhesive tapes and a fastening means such as clips to attach edges of the skin cover to the lower mold so as to place the skin cover at a desired position.

However, the use of such adhering means often causes problems of spoiling the surface skin of the skin cover because of the excessively strong adherence or damaging the wadding provided on the back of the surface skin when removing the adhering means from the manufactured skin covered foamed plastic seat.

In addition, in manufacturing a skin covered foamed plastic seat, it has been difficult to place the skin cover over the lower mold in such a manner that no wrinkle appears on the skin cover of the manufactured skin covered foamed plastic seat in a vicinity of the side portion of the skin covered foamed plastic seat.

In particular, when corners of the skin covered foamed plastic seat are to incorporate a smoothly curved surface, it has been difficult to place the skin cover over the lower mold such that a desired shape in such corners can be obtained.

SUMMARY OF THE INVENTION

It is therefore an object of the present invention to provide a mold for manufacturing a skin covered foamed plastic article, with which it is possible to place the skin cover at a desired position, without spoiling or damaging the skin cover, such that the skin covered foamed plastic article of a desired shape without any deficiencies such as wrinkles and dents can easily be manufactured.

This object is achieved by the present invention by providing a mold for manufacturing a skin covered foamed plastic article comprised of a pad member covered by a skin cover, comprising an upper mold, and a lower mold, to be assembled with the upper mold in order to form a cavity in which a liquid foam resin undergoes a foaming process to become the pad member, over which a skin cover is to be placed, the lower mold including at least one window at which the skin cover can be pushed outward by pressure of the liquid foam resin.

Other features and advantages of the present invention will become apparent from the following description taken in conjunction with the accompanying drawings.

DETAILED DESCRIPTION OF THE PREFERRED EMBODIMENTS

Figure 1:
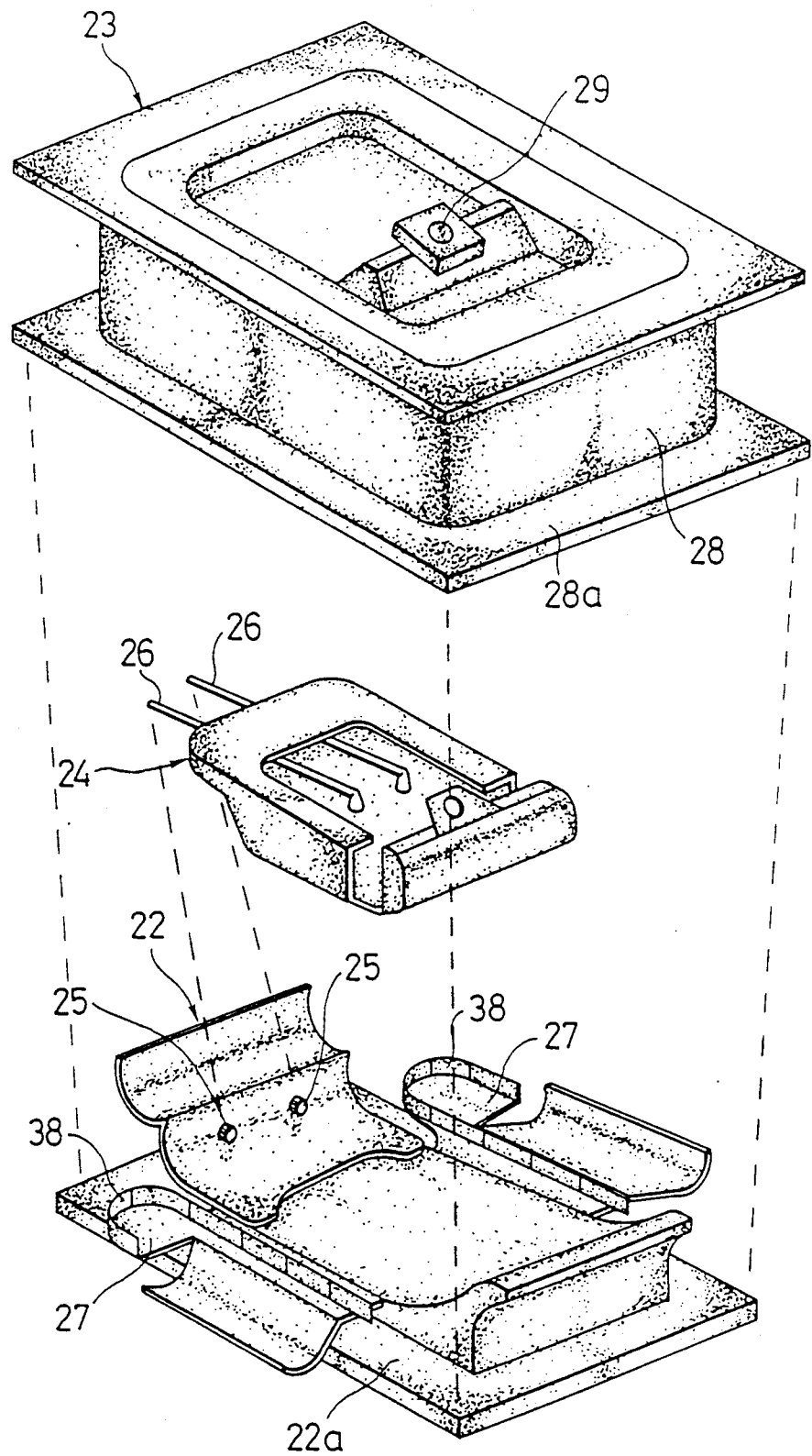
FIG. 1 is an expanded view of one embodiment of a mold for skin covered foamed plastic molding according to the present invention.

Referring now to FIG. 1, there is shown one embodiment of a mold for manufacturing a skin covered foamed plastic article according to the present invention.

In this embodiment, a mold comprises a lower mold 22, an upper mold 23 to be assembled with the lower mold 22, and a middle mold 24 to be inserted between the lower mold 22 and the upper mold 23.

The lower mold 22 has, on its front end side, a pair of holes 25 for supporting a pair of rods 26 of the middle mold 24 to be inserted therein, by means of which insertion ports for a head rest stay will be made on the skin covered foamed plastic seat to be manufactured.

Figure 2:
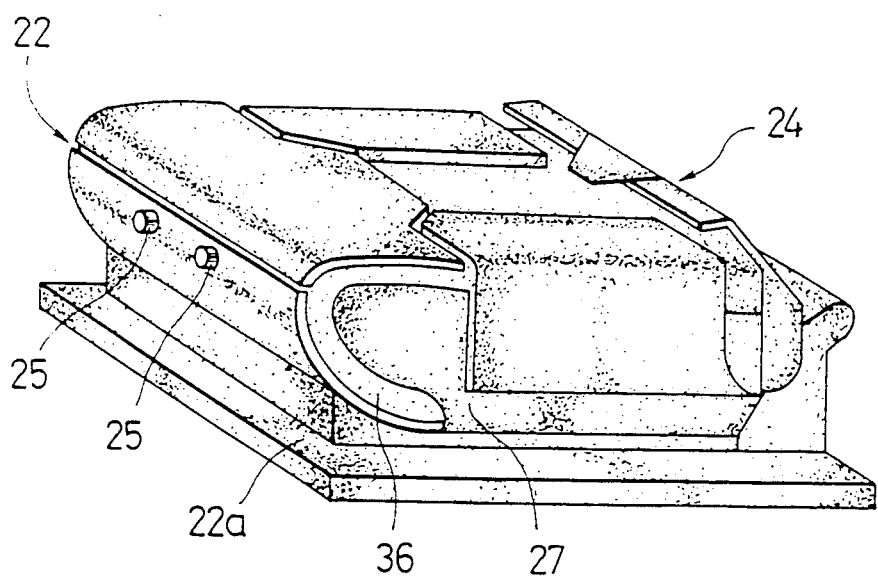
FIG. 2 is a perspective view of the mold of FIG. 1 in a state of being assembled.

Also, on it sides, the lower mold 22 has openable side walls 27, which can freely be opened and closed by means of hinges provided at their bottom edges. Each of these openable side walls has a shaping plate 38. Moreover, these openable side walls 27 have such shapes that when the lower mold 22 and the middle mold 24 are assembled as shown in FIG. 2, there are windows 36 at corners of the skin covered foamed plastic article to be manufactured.

Figure 3:
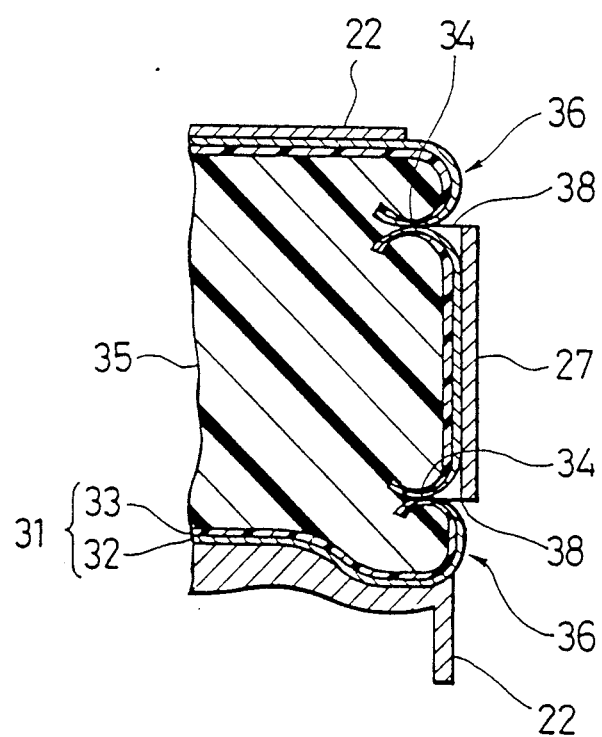
FIG. 3 is a partial transverse cross sectional view of a skin covered foamed plastic seat manufactured by the mold of FIG. 1.

Now, as shown in FIG. 3, a skin cover 31 comprised of a surface skin 32 and a wadding 33 with sewn portions 34 at which different pieces of the skin cover 31 are stitched together, is to be placed over the lower mold 22. The skin cover 31 will be incorporated with a pad member 35 made from liquid foam resin to be poured into this mold over the skin cover. Here, the openable side walls 27 of the lower mold 22 are closed such that the shaping plate 38 is positioned at the sewn portions 34, so that the position of the skin cover 31 with respect to the lower mold 22 is secured.

The upper mold 23 has a casing 28 whose bottom edge 28a will be put on a bottom plate 22a of the lower mold 22, and an opening 29, through which the liquid foam resin to become the foamed plastic pad member 35 after the foaming process is completed will be poured.

Thus, when the skin covered foamed plastic article is manufactured with this mold by placing the skin cover 31 over the lower mold 22, assembling the lower mold 22, upper mold 23, and middle mold 24, and then pouring the liquid foam resin into the mold, portions of the skin cover 31 located at the positions of the windows 36 will be pushed outward by the pressure of the liquid foam resin, as shown in FIG. 3, so that smoothly curved corners without wrinkles or dents can be obtained.

As explained, according to this embodiment, it is possible to provide a mold for manufacturing a skin covered foamed plastic article, with which it is possible to place the skin cover at a desired position, without spoiling or damaging the skin cover, such that the skin covered foamed plastic article of a desired shape without any deficiencies such as wrinkles and dents can easily be manufactured.

It is to be noted that although in the above embodiment, the windows 36 are formed at the corners of the mold so as to obtain smoothly curved corners in the manufactured skin covered foamed plastic article, these locations of the windows 36 may be changed to other parts of the mold at which the placing of the skin cover 31 is difficult.

Besides this, many modifications and variations of the above embodiment may be made without departing from the novel and advantageous features of the present invention. Accordingly, all such modifications and variations are intended to be included within the scope of the appended claims.

What is claimed is:

1. A mold for manufacturing a skin covered foamed plastic article having smoothly curved sections and comprised of a pad member covered by a skin cover, the skin cover including sewn portions formed along the smoothly curved sections, and the mold comprising:

an upper mold; and a lower mold including a base member defining a mold surface for receiving the skin cover, for assembly with the upper mold to define a cavity for receiving a liquid foam resin which is poured onto the skin cover to form the pad member;

first wall portions extending upwardly from the base member; and second wall portions pivotally mounted to and extending upwardly from the base member, the second wall portions being spaced apart from the first wall portions to define window regions corresponding to the smoothly curved sections of the skin covered foamed plastic article so that the skin cover can be pushed outwardly by pressure of the liquid foam resin;

wherein the second wall portions include plate members provided along edges of the window regions, for securing the sewn portions of the skin cover in position at the edges of the window regions during foaming of the liquid foam resin.

2. The mold of claim 1, wherein the window regions are located at corners of the lower mold.

* * * * *